(12) United States Patent
Tuomela et al.

(10) Patent No.: US 7,577,459 B2
(45) Date of Patent: Aug. 18, 2009

(54) ESTABLISHING A COMMUNICATION LINK

(75) Inventors: Urpo Tuomela, Oulu (FI); Sami Ronkainen, Oulu (FI)

(73) Assignee: Nokia Corporation, Espoo (FI)

( * ) Notice: Subject to any disclaimer, the term of this patent is extended or adjusted under 35 U.S.C. 154(b) by 65 days.

(21) Appl. No.: 11/127,995

(22) Filed: May 11, 2005

(65) Prior Publication Data

US 2006/0258408 A1    Nov. 16, 2006

(51) Int. Cl.
  *H04M 1/00*    (2006.01)
  *H04B 5/00*    (2006.01)
  *H04W 4/00*    (2006.01)

(52) U.S. Cl. .............. 455/553.1; 455/41.1; 455/552.1; 455/426.1

(58) Field of Classification Search .......... 455/568, 455/517, 100, 552.1, 574, 41, 419, 426.1, 455/553.1, 572, 573, 41.1–41.3, 418–420, 455/426.2; 379/40
See application file for complete search history.

(56) References Cited

U.S. PATENT DOCUMENTS

| | | | | |
|---|---|---|---|---|
| 2,395,647 | A * | 2/1946 | Strobel | 331/80 |
| 4,825,457 | A * | 4/1989 | Lebowitz | 379/40 |
| 6,104,913 | A * | 8/2000 | McAllister | 455/41.1 |
| 6,118,882 | A | 9/2000 | Haynes | 381/374 |
| 6,223,018 | B1 * | 4/2001 | Fukumoto et al. | 455/41.1 |
| 6,754,472 | B1 * | 6/2004 | Williams et al. | 455/100 |
| 6,859,657 | B1 | 2/2005 | Barnard | 455/575.6 |
| 6,879,806 | B2 * | 4/2005 | Shorty | 455/11.1 |
| 7,139,529 | B2 * | 11/2006 | Rekimoto et al. | 455/41.3 |
| 2002/0049079 | A1 * | 4/2002 | Buckley et al. | 455/568 |
| 2002/0128030 | A1 * | 9/2002 | Eiden et al. | 455/519 |
| 2002/0172185 | A1 * | 11/2002 | Mito et al. | 370/347 |
| 2004/0202339 | A1 | 10/2004 | O'Brien, Jr. et al. | 381/312 |
| 2004/0248513 | A1 * | 12/2004 | Glass et al. | 455/41.1 |
| 2006/0052056 | A1 * | 3/2006 | Park et al. | 455/41.1 |

FOREIGN PATENT DOCUMENTS

| | | |
|---|---|---|
| EP | 1024626 A1 | 8/2000 |
| EP | 1024626 A1 * | 8/2000 |
| WO | WO-03/100739 | 12/2003 |

OTHER PUBLICATIONS

Bluetooth SIG Security Expert Group, Bluetooth Security White Paper, Apr. 10, 2002, Rev. 1.00, pp. 10-11.*
"Bluetooth Specification Including Core v1.2", pp. 224-236, pp. 188, 195.
Gupta, P., "Personal Area Networks: Say it And You Are Connected!", Jan. 3, 2005, From Internet: http://web.archive.org./web/20050301221244/http://www.wirelessdevnet.com/channels/bluetooth/features/pans3.html, 3 pages.

* cited by examiner

*Primary Examiner*—Lester Kincaid
*Assistant Examiner*—Daniel Lai
(74) *Attorney, Agent, or Firm*—Harrington & Smith, PC (57) ABSTRACT

Wireless communication is provided between a mobile telephone handset and a headset worn by a person that uses the handset, through a first, wireless link such as Bluetooth. A second communication link is established by passing electrical currents between the handset and the headset through the body of the person. Communication through the second link is used to control operation of the first link.

35 Claims, 6 Drawing Sheets

Pairing through the body network, with Bluetooth off

ESTABLISHING A COMMUNICATION LINK

FIELD OF THE INVENTION

This invention relates to mobile communication apparatus for use by a person, for establishing a communication link with a remote unit, and has particular but exclusive application to mobile personal telecommunications apparatus for establishing a local link to a remote unit such as a headset.

BACKGROUND

It is well-known that a wireless link can be created between mobile personal communication apparatus such as a mobile telephone handset and a remote unit such as a headset, using a wireless link. Commonly, the wireless link is established according to the well-known Bluetooth specifications described in detail at www.bluetooth.org. Briefly, Bluetooth makes use of an encrypted 2.45 GHz channel hopping radio link, which may provide duplex communication between local devices. Each device is provided with a unique identification code which is communicated to the other device in a process known as pairing so that a secure wireless link can be established between them. The devices are usually arranged in a master and slave relationship and the master device may continually seek to establish communication with the slave.

Other wireless links are known, for example infrared and also Zigbee developed by the Zigbee Alliance, described at www.Zigbee.org.

A problem with these known arrangements is that the personal mobile communications apparatus and the remote unit are generally battery powered and in order to provide automatic wireless connection between the devices, the circuitry associated with the wireless link needs to be continually on. However, the headset may not necessarily be configured ready for use. For example, the headset may be switched off or not deployed on the head of a user. Also, the circuitry for the wireless link in the handset may be switched off, so that when the headset is deployed by a user, it may not be possible to establish an automatic wireless connection from the headset to the handset.

Also, some users of handsets prefer to leave the wireless link circuitry switched off to avoid third parties forming an unwanted connection to the handset, which might permit data to be extracted from the memory of the handset. This is known as "bluesnarfing" in relation to Bluetooth.

Another problem that can arise is that when a wireless link is established between the handset and the headset, the handset adopts a profile by which communication for a telephone call through the mobile telephone network is routed solely through the wireless link between the handset and the headset. For an incoming call, an alerting signal is sent through the wireless link to the headset but not necessarily to the loudspeaker of the handset, on the assumption that the headset is in the vicinity of the user's ear. However, if the headset is not actually in place at the user's ear but instead worn around the neck or otherwise in close vicinity of the user, they will not be able to hear the alerting signal for the incoming call. Hitherto, to avoid this problem, the profile adopted by the telephone handset, may be defined so that both the loudspeaker of the telephone handset and the headset produce an audible alerting signal when the call is routed to the headset. However, the loud, audible alerting signal from the handset can be a problem when the user is wearing the headset to avoid disturbing other people.

Alternative approaches to providing a connection between devices situated about a person have been proposed that make use of the person's body as a conduit for electrical signals. U.S. Pat. No. 6,754,472 to Williams et al discloses an arrangement by which individual devices are connected in a network by means of electrodes that provide electrical connections to the human body.

WO2003/100739 to Ident Technology AG discloses a system in which objects in the vicinity of the human body are detected by sending electrical signals through the human body, the signals being created through the use of an electrode that capacitively couples an electrical signal to the human body.

SUMMARY OF THE INVENTION

It is an object of the invention to provide an improved wireless communication link between mobile communication apparatus for use by a person and a remote unit, which can overcome the problems and disadvantages aforesaid.

According to the invention, there is provided a mobile communication apparatus for use by a person, which comprises a first communications device for establishing a first, wireless communication link with a remote unit, and a second communications device for establishing a second communication link with the remote unit through the body of a person.

The first communication device may be configured to provide a Bluetooth wireless link. The second communication device may include a transmitter to apply an electrical current to the skin of the person. The transmitter may include an electrode to apply the current directly to the skin of the person or the current may be induced electrostatically.

The transmitter may include a pulse generator and a modulator to modulate the pulse generated by the pulse generator with an identification code corresponding to mobile communication apparatus. The identification code may be used for pairing the apparatus with the remote unit.

The second communication device may include a receiver to receive the signal current from the remote unit through the body of a person, and the receiver may include an electrode that receives the signal current either by direct contact with the skin of a person or the signal may be induced electrostatically without direct contact between the electrode and the skin.

In one embodiment, the mobile communication apparatus comprises a telecommunications device and includes a transceiver for providing a telecommunications link with the cellular mobile network.

The second communication device may be operable to receive information through the second link i.e. through the body of a person from the remote unit, indicative of whether the remote unit is in an operational state to communicate through the first, wireless link. The second communication device may signal to the remote unit through the second link to place the first wireless link in an operational state. Also, the second device may signal to the remote unit that the first communication device of the apparatus is to be powered off, such as to enable the remote unit to power down its connection to the first communication link.

The apparatus according to the invention may include an acoustic transducer to provide an audible output, processor to provide an audio signal for the transducer to produce the audible output, the second communication device being operable through the second link to determine whether the remote unit is in an operational condition to process the audio signal at an acoustic transducer at the remote unit, and the process of being operable to route the audio signal selectively to at least one of the acoustic transducers depending on the operational condition of the remote unit.

In one embodiment, the mobile communication apparatus comprises a headset and in another embodiment, a mobile telephone handset.

The invention also includes a method of communicating between a mobile communication apparatus for use by a person, and a remote unit, comprising: establishing a first wireless communication link with the remote unit, and establishing a second communication link with the remote device through the body of a person.

BRIEF DESCRIPTION OF THE DRAWINGS

Features and advantages of the present invention will become apparent from the following description of an embodiment thereof given by way of illustrative example with reference to the accompanying drawings, in which.

DETAILED DESCRIPTION

Overview

Figure 1:
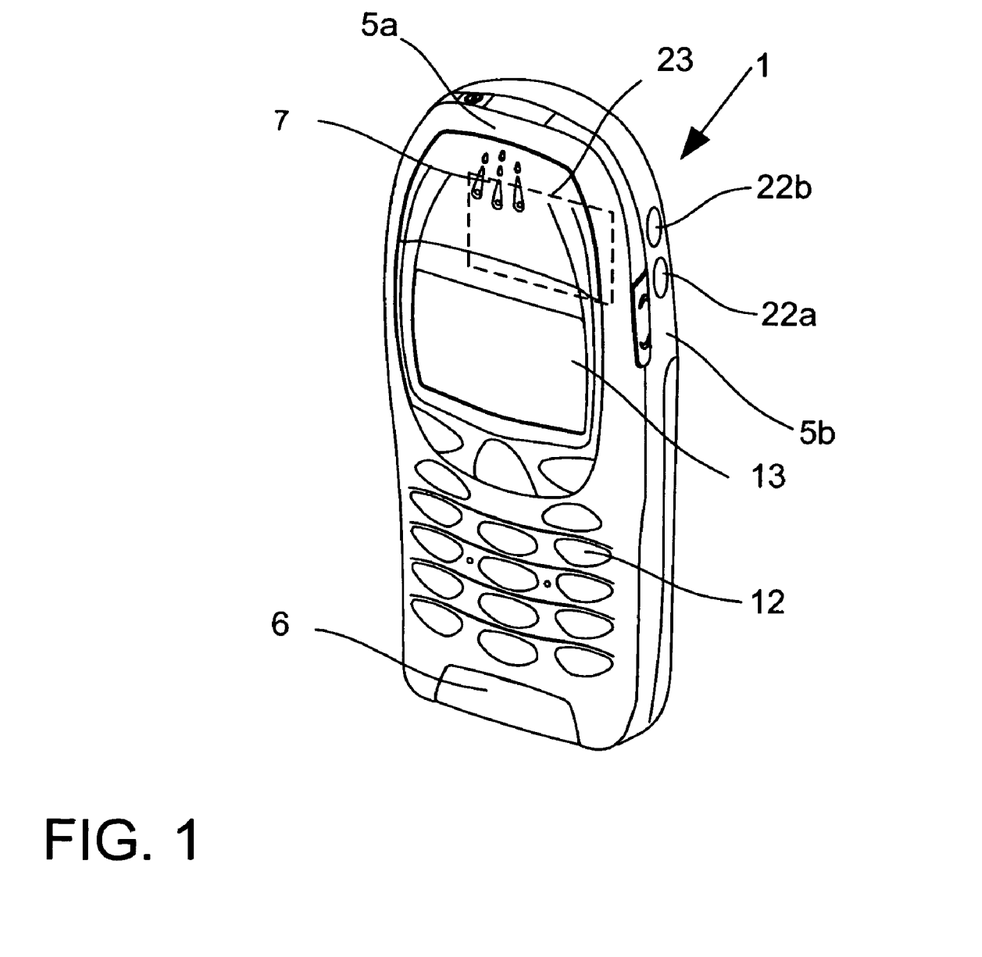
FIG. 1 is a schematic perspective view of a mobile telephone handset.

FIG. 1 illustrates a first example of communication apparatus according to the invention, in the form of a mobile telephone handset 1 for a cellular telecommunications network e.g. GSM, 2.5 G or 3 G networks.

Figure 2:
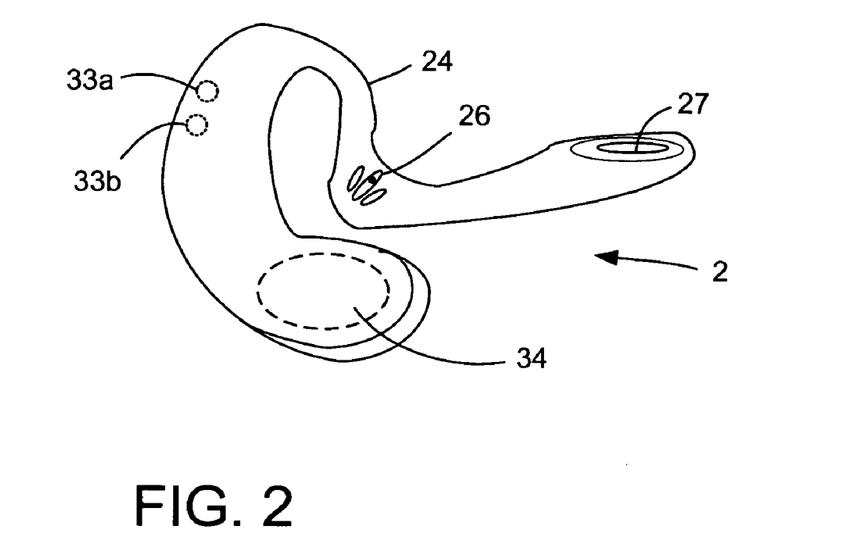
FIG. 2 is a schematic perspective view of a wireless headset for use with the handset of FIG. 1.

FIG. 2 illustrates another example of communication apparatus in accordance with the invention, in the form of a headset 2 for establishing a wireless communication link with a handset 1 e.g. by means of a Bluetooth link to be described in more detail later.

Figure 3:
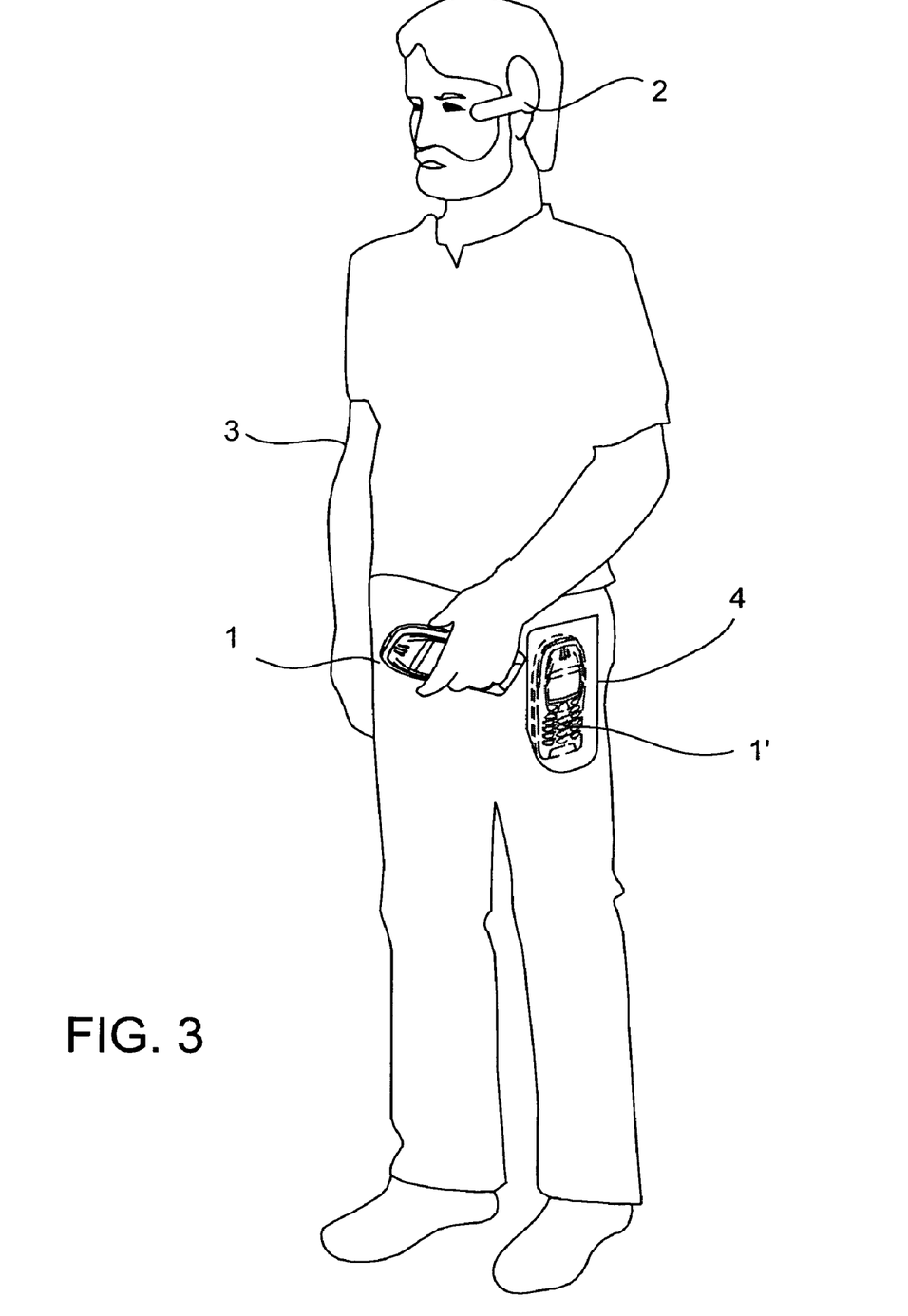
FIG. 3 illustrates the handset and the headset when deployed on a person using them.

FIG. 3 illustrates the handset 1 and headset 2 when deployed by a person 3. The handset 1 may be deployed in direct contact with the skin of a person, gripped in the person's hand in this example, or the handset may be deployed so as not to be in direct contact with the skin, for example in a pocket 4 so that one or more layers of fabric are disposed between the handset 1 and the user's skin. Handset 1' is illustrated in pocket 4, in dotted outline, separated from the skin of person 3 by layers of fabric.

Figures 4, 5:
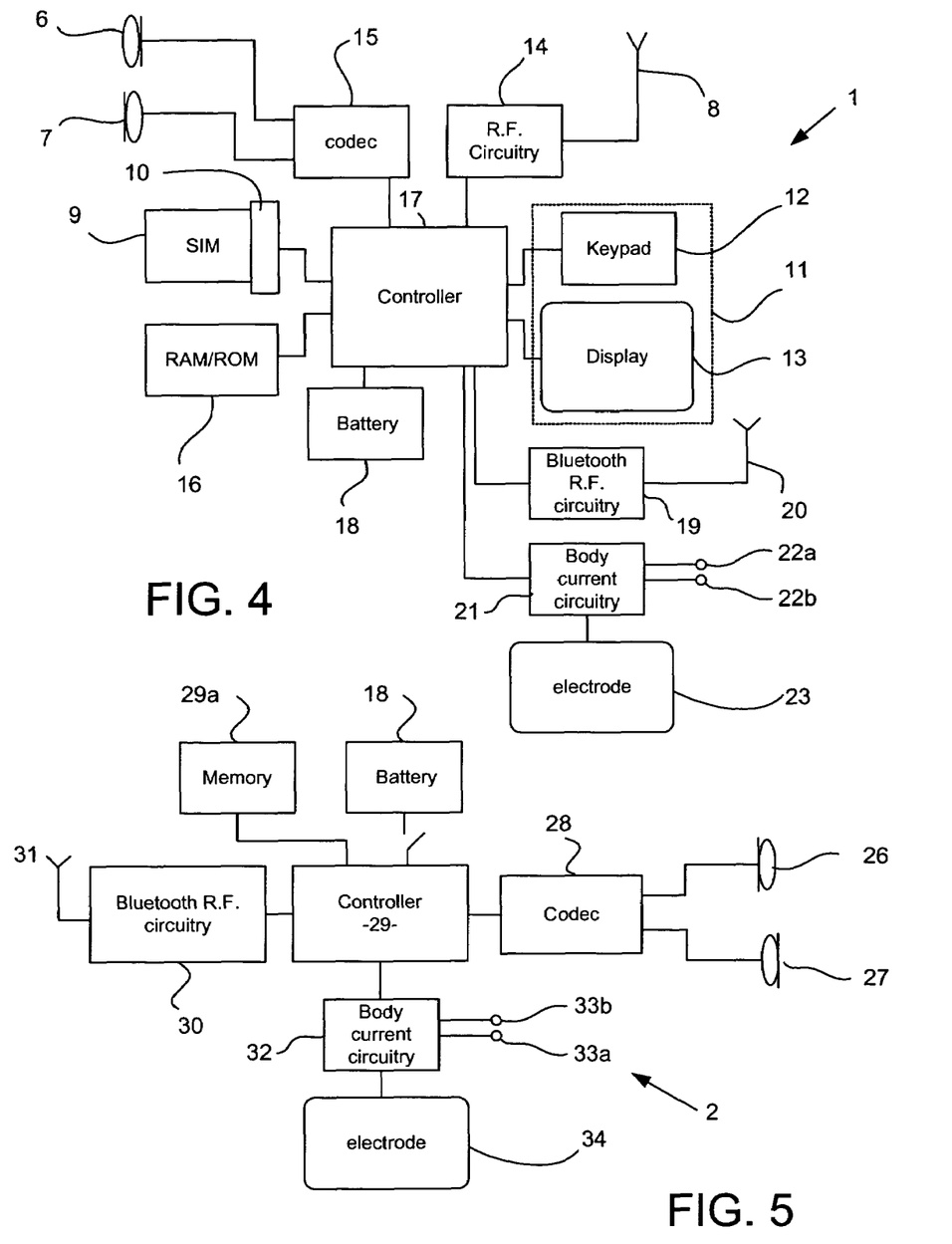
FIG. 4 is a schematic block diagram of the major circuit components of the handset.
FIG. 5 is a schematic block diagram of circuit components of the headset.

FIG. 4 illustrates the major circuit components of the handset 1 shown in FIG. 1. Referring to FIGS. 1 and 4, the handset comprises an outer case 5 that has a front part 5a and rear part 5b, a microphone 6, an earpiece/loudspeaker 7, an antenna 8, a subscriber identity module (SIM card) 9 and an associated SIM card reader 10. The handset 1 also includes a user interface 11 comprising a keypad 12 and LCD display panel 13. The circuitry of the mobile handset 1 includes radio interface circuitry 14, codec circuitry 15 and a RAM/ROM memory 16. These circuits operate under the control of a micro controller 17 so as to provide voice and data communication over a cellular telecommunications radio link through antenna 8 to a mobile network as well-known in the art. The circuitry of FIG. 4 is powered by rechargeable battery 18.

Additionally, the handset 1 includes a first communication device in the form of Bluetooth RF circuitry 19 which can establish a first, wireless communication link with the headset 2 shown in FIG. 2, via antenna 20. The details of the Bluetooth RF circuitry 19 are well-known to those skilled in the art. The circuitry 19 operates under the control of micro controller 17 to perform the usual Bluetooth functions described in more detail at www.bluetooth.org.

Also, the circuitry of the handset 1 includes a second communication device that includes body current circuitry 21 for establishing a second communication link with the headset 2. The body current circuitry 21 is coupled to a pair of electrodes 22a, 22b which, as shown in FIG. 1 are arranged on the exterior surface of the rear cover part 5b for direct contact with the skin of the person 3 using the handset 1, as illustrated in FIG. 3. This enables a body current to be applied directly to the skin of the person 3.

Also, the body current circuitry 21 is connected to a larger electrode 23 which is disposed on the interior surface of the casing 5 as illustrated schematically in FIG. 1. The electrode 23 is configured to induce a current electrostatically into the skin of the person 3 when the person is not in direct contact with the electrodes 22. For example, the handset 1 may be in location 1' shown in FIG. 3 in pocket 4 of the person 3 using the handset, with layers of fabric between the electrode 23 and the skin of the person. The electrode 23 thus forms a capacitative coupling with the skin to allow the second communication link through the skin of a person to be established. It will be appreciated that the handset need not necessarily be in the person's pocket but may be in a bag or other receptacle in close proximity to the person concerned, for example when travelling in an automobile. The capacitative coupling technique for electrode 23 is described in more detail in WO2003/100739 to Ident Technology AG, which is incorporated herein by reference.

The headset 2 shown in FIG. 2 has circuitry illustrated in FIG. 5. The headset 2 has a moulded plastics housing 24 that contains a rechargeable battery 25, a microphone 26, an earpiece 27, a codec 28 and a micro controller 29 with an associated memory 29a. The headset 2 includes a first communication device in the form of Bluetooth RF circuitry 30 and an associated antenna 31, for establishing the first communication link with corresponding Bluetooth circuitry and antenna 19, 20 of the handset 1 shown in FIG. 4. Also, the headset 2 includes a second communication device in the form of body current circuitry 32 for establishing the second communication link through the skin of the body of the person 3, to the handset 1. The body current circuitry 32 is coupled to a pair of electrodes 33a, 33b which are disposed on the exterior surface of the casing 24, such as to make contact with the skin of the person using the headset 2, so as to enable a current to flow through the skin of the person 3 to the handset 1. Additionally, the body current circuitry 32 is connected to an electrode 34 on the interior of the casing 24, to form a capacitative coupling with the skin of the person 3 using the headset 2, in a similar manner to the electrode 33 shown in FIG. 4, in the event that the electrodes 33a, 33b do not make a direct contact with the skin, for example if a hat is being worn or the person's hair gets in the way of electrodes 33a, 33b.

Figure 6:
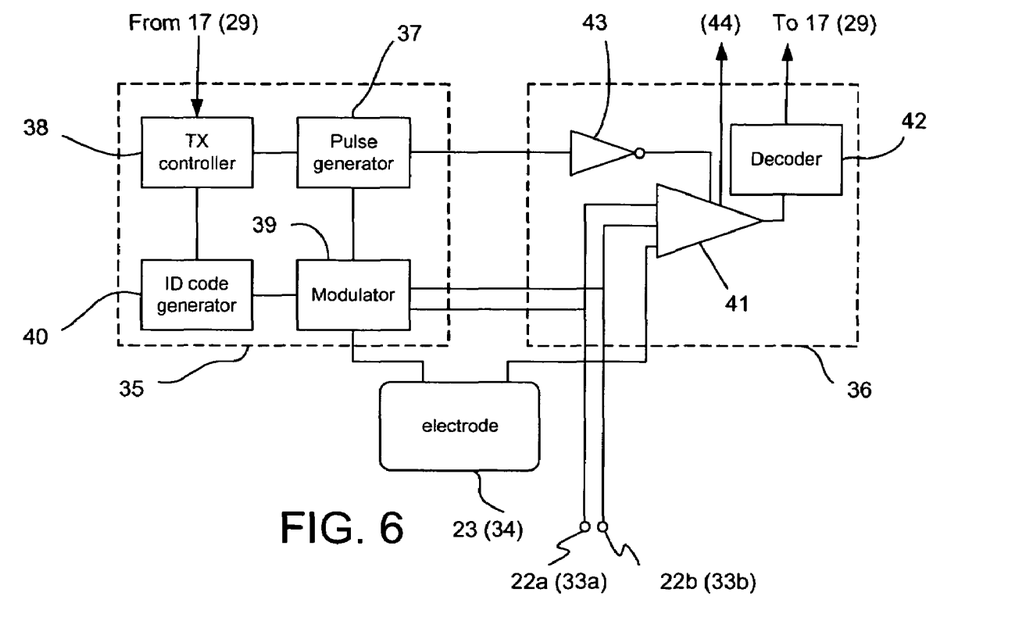
FIG. 6 is a schematic circuit diagram of body current circuitry provided in both the handset and the headset.

FIG. 6 illustrates an example of the body current circuitry shown in FIGS. 4 and 5. The body current circuitry 21 for the handset 1, is illustrated in detail in FIG. 6 but it will be understood that the body current circuitry 32 of the headset 2 shown in FIG. 5 is of a similar construction. Referring to FIG. 6 in detail, the body current circuitry 21 includes a transmitter section 35 and a receiver section 36, each shown in dotted outline. The transmitter section 35 includes a pulse generator 37 that produces pulses with a duration of the order of milliseconds, periodically under the control of a transmission controller 38 that is controlled by the micro controller 17 shown in FIG. 4. Pulses from the pulse generator 37 are modulated by a modulator 39 with a digital identification code generated by a code generator 40 under the control of the transmission controller 38. The identification code produced by code 40 corresponds to a code that identifies the handset 1 uniquely.

The modulated pulses produced by modulator 39 are applied at a suitable voltage to the electrodes 22a, 22b so as to create a signal current on the skin of the person using the handset, when the electrodes are in contact with the skin. Also, the modulated pulses from modulator 39 are applied at a higher voltage to electrode 23. As previously explained, electrode 23 can induce electrostatically the modulated signal current in the skin of the person 3 using the handset, when the electrodes 22a, 22b are not in direct contact with the skin. In this way, the transmitter section 35 can open the previously described second communication link with the headset 2.

The receiver section 36 is configured to receive modulated pulses from the skin of the person 3, produced by the transmitter of the corresponding current circuitry 32 in the headset 2. The receiver section 36 includes an amplifier 41 connected to the electrodes 22a, 22b and the electrode 23, to amplify a signal current received directly through the electrodes 22a, 22b from the skin of the person 3, received from the body current circuitry 32 of the headset 2. Alternatively, the signal current from the headset 2 transmitted through the skin of the person 3, can electrostatically induce a voltage in the electrode 23 and detected by the amplifier 41. The amplified signal produced by amplifier 41 is fed to a decoder/demodulator 42, which demodulates the ID code from the ID code generator of body current circuitry 32 in handset 2 and feeds a digital signal corresponding to the ID code of the handset 2 to the controller 17.

The amplifier 41 may be disabled during operation of the transmitter 35 by inverting amplifier 43, to avoid the receiver section 36 detecting the ID code generated by generator 40 during operation of the transmitter section 35.

Figure 7:
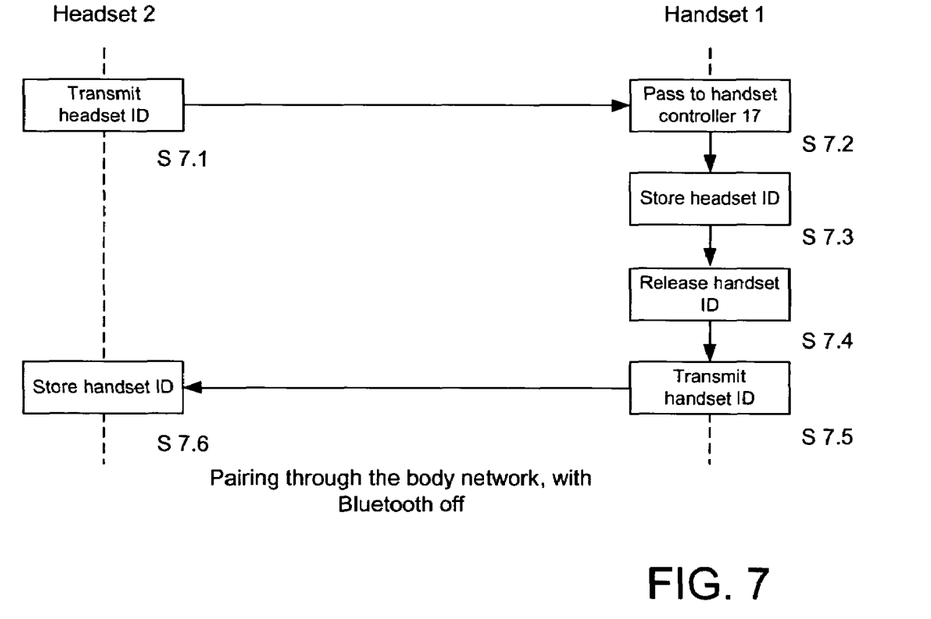
FIG. 7 is a schematic signalling diagram relating to pairing of the handset and the headset.

The network formed by sending signals between the handset 1 and the headset 2 through the body of the person 3, will be referred to hereinafter as the body network Pairing FIG. 7 is a signalling diagram of a pairing process carried out through the second communication link i.e. by means of a signal communication through the body network formed between the handset 1 and headset 2.

At step S7.1, the headset 2 is switched on so as to be powered by its rechargeable battery 25. Initially, the controller 29 enables operation of the body current circuitry 32 but disables operation of the Bluetooth r.f. circuitry 30 in order to save power.

The controller 29 then commands the transmission controller (38) of the body current circuitry 32 to transmit the ID code for headset 2 to the handset 1 through the body network.

The transmission controller (38) commands the pulse generator (37) and ID code generator (40) such that the modulator (39) produces a pulse that is modulated with the identity code. The pulse is transmitted through electrodes 33 or 34 through the skin of the body of a person 3 wearing the headset 2, to the handset 1 where the pulse is detected by the receiver section 36 shown in FIG. 6. The ID code corresponding to the headset 2 is passed by decoder 42 to the controller 17 of the handset 1 shown in FIG. 4.

At step S7.2, the the identification code for the headset 2 is passed to the controller 17 of the handset 1. If the user wishes to establish pairing, the person 3 can suitably actuate keypad 12 to signify acceptance of the ID code. The code is then stored in the handset 1 at step S7.3, for example in memory 16.

Thereafter, at step S7.4, the the unique identification code for the handset 1 is sent to the headset for pairing purposes.

At step S7.5, the controller 17 commands the transmission controller 38 shown in FIG. 6 to actuate the transmitter section 35 so as to generate a pulse modulated with the ID code corresponding to the handset 1 from generator 40, which is then transmitted through the skin of the person 3, to be received by electrodes 33 or 34 of the headset 2 shown in FIG. 5.

The body current circuitry 32 decodes and demodulates the identification code for the handset 1 and stores it in memory 29a associated with the controller 29 of the handset 2. Thus, each of the handset 1 and the headset 2 devices learn the identification code of the other of the devices. In the described procedure, pairing is achieved without the need to power on the Bluetooth circuitry in either the handset 1 or the headset 2.

Alternatively, the pairing can be carried generally as described in the Bluetooth specifications but through the body network rather than over the usual Bluetooth radio link. Reference is directed to version v1.2 of the Bluetooth specification which is incorporated herein by reference, for a full discussion of the signal protocols used for Bluetooth pairing and authentication. The specification can be found at: http://www.bluetooth.org/foundry/adopters/document/Bluetooth Core Specification v1.2

As well known in the art, radio communication in Bluetooth is encrypted using a secret key that is shared between devices, known as a link key. To initiate communication, a cryptographic challenge in the form of a random number is sent by one device, a challenger, to another, respondent device, which produces a response using the link key and the random number. This response is compared with a corresponding response produced by the challenger using the link key for authentication purposes.

If the devices do not have a shared link key, it is created by a process referred to as pairing in the Bluetooth specifications. According to the invention, the pairing can be carried out through the body network. rather than through the air interface over the Bluetooth radio link, such that the signals conventionally sent over the radio link for pairing are conveyed through the body network. To this end, the transmitter section 35 of FIG. 6 is modified so that the modulator 39 is under the direct control of the controller 38, which in turn is controlled by conventional Bluetooth pairing processes run by the controller 17. Thus, pulses developed by pulse generator 37 can be modulated according to the challenges and responses used in the conventional Bluetooth pairing processes and the receiver section 36 can process accept responses and feed corresponding received data to the controller 17.

Once pairing has been achieved by either of the described methods, the first communication link i.e. the Bluetooth wireless link can be opened between the Bluetooth circuitry 19 of the handset 1 and Bluetooth circuitry 30 of the headset 2. This process will now be described with reference to FIG. 8.

Enabling and Managing a Bluetooth Session

Figure 8:
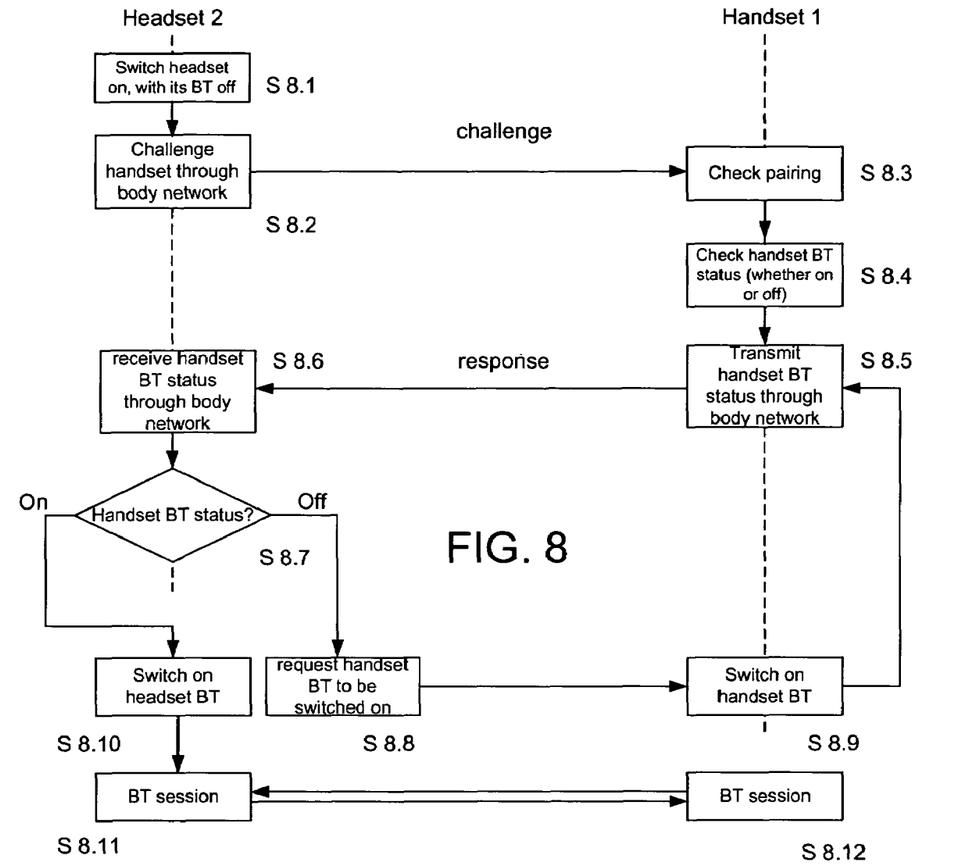
FIG. 8 is a signalling diagram for a process in which the headset instructs the handset to switch on its wireless link to enable a wireless session to proceed between the handset and the headset.

Initially, at step S8.1, the user 3 deploys the headset 1 ready for use. The controller 29 switches power from the battery 18 such as to enable the body current circuitry 32 but not to enable the Bluetooth circuitry 30 initially.

Then, at step S8.2, the controller 29 commands the body current circuitry 32 to send a challenge through the skin of the person 3 to the handset 1. The challenge may comprise the identity code for the handset 2 generated by generator (40) as previously described.

The challenge is decoded and demodulated at the handset 1 and fed to the controller 17 of the handset 1 as previously described, and at step S8.3, the identity code of the handset is checked with the corresponding stored value held in memory 16 in order to check the pairing of the devices and authenticate the headset for use with the handset 1.

Assuming that the authentication is successful, at step S8.4, the controller 17 determines the operational status of the Bluetooth circuitry 19 of the handset 1. It will be understood that the Bluetooth circuitry may have been already switched on by the user in order to establish Bluetooth links with other peripheral devices or the user may have switched off Bluetooth circuitry in order to save power and to minimise the risk of bluesnarfing.

Then at step S8.5, the controller 17 commands the transmitter section 35 (FIG. 6) of the body current circuitry 31 to modulate a pulse from pulse generator 37 with the ID code for the handset 1 together with an additional data bit which signifies the operational status of the Bluetooth circuitry 19 of the handset 1, i.e. whether the circuitry 19 is on or off. The modulated pulse is transmitted by the handset 1 at step S 8.5 through the body network to the headset 2 as a response to the challenge transmitted by the headset in step S8.2.

At step S8.6, the headset 2 receives the response and the information contained in it, from the body network, and so the controller 29 receives both the ID code of the handset and the status information concerning the operational status of the Bluetooth circuitry 19 of the handset 1. The ID information is checked for authentication purposes against the corresponding data stored in memory 29a.

The handset status information is checked at step S8.7. If the Bluetooth circuitry 19 of the handset 1 is indicated by the status information to be switched off, a request to switch it on is transmitted at step S8.8 through the body current circuitry 32 of headset 2, to the handset 1, where it is received by receiver section 36. The request may comprise an additional bit sequence supplied by transmission controller (28) in the body current circuitry 32 to the modulator (39). The additional bit sequence, is appropriately decoded by decoder 42 and fed to controller 17 upon receipt by the receiver section 36 in the handset 1.

At step S8.9, the controller 17 commands the Bluetooth circuitry 19 of handset 1 to switch on and when this process is successfully completed, the new i.e. "switched on" status is transmitted through the body current circuits from handset 1 to headset 2 at step S8.5. Thus, if the user of the handset had previously switched off the Bluetooth circuitry 19, it is commanded by headset 2 to switch on ready for a Bluetooth session.

Referring again to steps S8.6 and S 8.7, when the handset Bluetooth circuitry 19 is switched on, the controller 29 of headset 2 commands the Bluetooth circuitry 30 to switch on, at step S8.10.

With the Bluetooth circuits 19, 30 both now switched on, a Bluetooth, wireless session can be commenced between the headset 2 and handset 1 as illustrated at steps S8.11 and S8.12.

Figure 9:
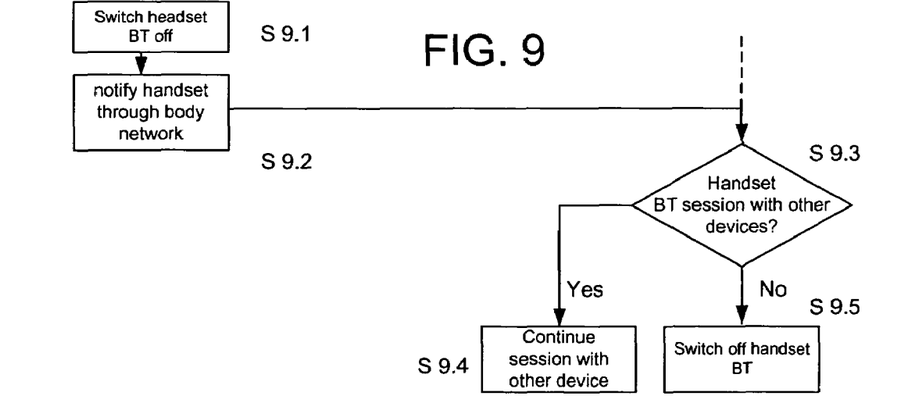
FIG. 9 is a signalling diagram of a process in which the headset instructs the handset to switch off its wireless link with the headset.

At the end of the Bluetooth session, the controller 29 of the headset 2 may switch off the Bluetooth circuitry 30 in order to save power. Also, the Bluetooth circuitry of the handset 1 can be switched off selectively to provide a further power saving and protection against bluesnarfing. Referring to FIG. 9, at step S9.1, the controller 29 switches off the Bluetooth circuitry 30 of the headset 2. At step S9.2, the controller 29 instructs the body current circuitry 30 to send a "switch off" command to the handset 1 through the body of the person 3 using the headset. A suitable command can be created by instructing the transmission controller (38) to modulate the pulse generated by pulse generator (37) in the modulator (39) with a specific digital signal in addition to the ID code generated by generator (40). The command is decoded and demodulated by receiver section 36 of the body current circuitry 21 in the handset 1 and forwarded to the controller 17 of the handset.

At step S9.3, the controller 17 checks to see whether the Bluetooth circuitry 19 of the handset 1 is running a session with Bluetooth devices other than the headset 2. If so, the circuitry 19 remains switched on so that the session can continue, as shown at step S9.4. However, if no other sessions are running, the controller 17 commands the circuitry 19 to switch off and thereby save power.

Ring Tone Diversion

As well-known in the art, mobile handsets can operate according to different profiles so that when the headset is operationally connected to a handset, the ring tone alert produced in response to an incoming call can be routed solely to the headset with the loudspeaker of the handset being switched off. This has the advantage that if the headset is being used in a quiet area, no loud ring tone is produced by the handset itself. However, if a headset is not actually deployed on the head of the user, the user may not hear the ring tone alert. A partial solution to this problem is to convey the ring tone alert to both the handset and the headset but this had the disadvantage that the ring tone alert produced by the handset can be disturbing to others, for example in a quiet area such as a library.

Figure 10:
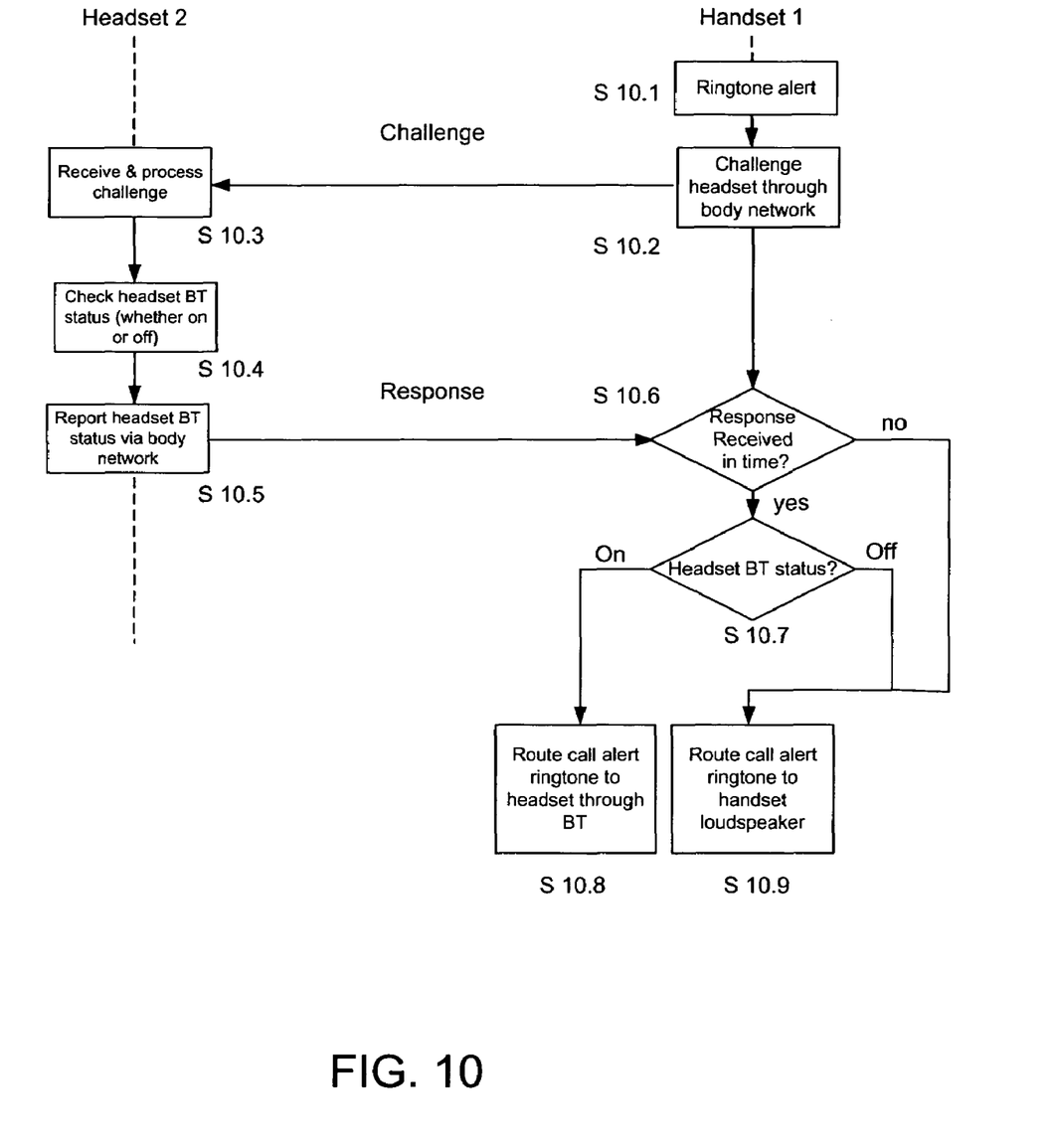
FIG. 10 is a signalling diagram that illustrates selective routing of a ring tone alerting signal either to the headset or the handset.

This problem can be addressed as illustrated in FIG. 10, by performing a check through the body network to determine whether the headset 2 is deployed ready for use.

Referring to FIG. 10 in more detail, at step S10.1, a controller 17 of the handset 1 produces a ring tone alert signal in response to an incoming call i.e. a call received through antenna 8 and RF circuitry 14. At step S10.2, the controller 17 instructs the body current circuitry 21 to send a challenge to the headset 2 through the body network. The challenge is generally similar to the challenge created at step S8.2.

Upon receipt of the challenge, the headset 2 at step S10.3 authenticates the pairing for the handset 1 and headset 2 in the manner previously described. Also, the receiver section (36) for the body current circuitry 32 of the headset 2, provides an output on line 44 if the body current for the challenge was received through the skin-contacting electrodes 33a, 33b. If so, the headset must, with a high degree of probability, be in place on the ear ready for use. If the body current was not detected through the electrodes 33a, 33b i.e. through the capacitatively coupled electrode 34, the headset is probably not disposed on the ear, and so the challenge process terminates, indicating to the handset that the headset is not disposed to convey a ring tone alert to the user, as will be explained in more detail hereinafter.

Assuming that the headset is disposed in skin contact i.e. on the ear, at step S10.4, the controller 29 of the headset 1 checks the status of the Bluetooth circuitry 30 to determine whether it is switched on or off. The status of circuitry 30 is reported back through the body network to the handset 1 at step S10.5 in a response to the challenge sent in step S10.2. The response, and the Bluetooth status information therein, can be generated in the headset 2 in a similar way to the status report generated at step S8.5 at the handset 1.

At step S10.6, the handset checks to determine whether a response to the challenge sent at step S10.2 is received through the body network. For example, the handset may check to determine if a response is received within a particular time window following the challenge. If no response is received within the time window, it is assumed that the headset is not disposed ready for use at the ear.

Assuming that a response is received within the time window, the Bluetooth operational status of the headset 2 is decoded from the response and fed to controller 17 in the handset 1 at step S10.6. If the Bluetooth circuitry 30 indicates that the headset circuitry is switched on, this must mean that the headset is deployed ready for use and is actually in place on the head of the person using the headset. The Bluetooth circuitry status for the headset 1 is checked at step S10.7 and if the circuitry 30 is on, the call alert ring tone is routed to the headset through the Bluetooth wireless link at step S10.8. Otherwise, the call alert ring tone is routed to the loudspeaker 7 of the handset 1 at step S10.9.

Also, if no response is received from the headset 2 within the time window at step S10.6, the call alert ring tone is fed to the loudspeaker of the handset 1 at step S10.9 since this indicates that the headset is not disposed on the ear ready for use. Thus, the ring tone alert signal is only fed to the headset 2 in the event that the headset is deployed ready for use i.e. in a situation where the person 3 will be able to hear the ring tone from the headset.

Many modifications and variations to the described examples of communication apparatus fall within the scope of the claimed invention. For example, the functionality of the transmitter section 35 and the receiver section 36 shown in Figure may not be provided by discrete circuits and can be integrated into the functionality of the controllers 17, 29. In particular, the identification codes for the handset 1 and headset 2 can be stored in the memories 16, 29a to be accessed by the respective controllers 17, 29 when needed.

Also, the invention is not restricted to the first, wireless link being implemented in Bluetooth and other radio links could be used such as Zigbee. The wireless link need not be a radio link and could for example be an optical link e.g. infrared.

Whilst the described examples of the invention comprise a telecommunications handset and headset, other devices can be employed, for example a personal digital organiser (PDA) and video viewing devices for use close to the user's eye for receiving a video stream over a wireless link from a handheld player device. Also, communication apparatus according to the invention may be incorporated into items of clothing to be worn by the user.

Furthermore, the initial pairing for the Bluetooth session described with reference to FIGS. 8 and 9, need not necessarily be done through the body network as described with reference to FIG. 7 but could be done in the usual way through the Bluetooth wireless link between the handset and headset.

Also, at least some of the authentication steps described with reference to FIGS. 8 to 10, that use the handset and headset pairing identification codes, can be omitted on the basis that when the handset and headset can communicate through the body network, particularly through the skin contacting electrodes 22, 33, it can be assumed that the handset and headset can communicate with one another safely.

The invention claimed is:

1. Apparatus, comprising:
   a first communications device to establish a first, wireless communication link with a remote unit, and a second communications device to establish a second communication link with the remote unit through the body of a person, and
   a controller to control operation, of the first and second communications devices;
   wherein the controller, when in operation, instructs the second communication device to send a challenge through the second communication link to the remote unit, and based on a received response to the challenge over the second communication link that comprises an indication of whether the remote unit is in an operational state to communicate through the first, wireless communication link, the controller instructs the remote unit through the second communication link to switch between operational and non operational states regarding communication through the first wireless communication link.

2. The apparatus as claimed in claim 1 wherein the first communication device is to provide a short-range wireless link with the remote unit.

3. The apparatus as claimed in claim 1 wherein the second communication device includes a transmitter to apply an electrical current to the skin of the person.

4. The apparatus as claimed in claim 3 wherein the transmitter includes an electrode to apply the current to the skin of the person.

5. The apparatus as claimed in claim 4 wherein the electrode is to apply the current by direct contact with the skin.

6. The apparatus as claimed in claim 4 wherein the electrode is to induce the current in the body electrostatically without direct contact between the electrode and the skin.

7. The apparatus as claimed in claim 3 wherein the transmitter includes a pulse generator and a modulator to modulate a pulse generated by the pulse generator with an identification code corresponding to said mobile communication apparatus.

8. The apparatus as claimed in claim 1 wherein the second communication device includes a receiver to receive a signal current from said remote unit through the body of the person.

9. The apparatus as claimed in claim 8 wherein the receiver includes an electrode to receive the current from the skin of the person.

10. The apparatus as claimed in claim 9 wherein the electrode is to receive the current by direct contact with the skin.

11. The apparatus as claimed in claim 9 wherein the electrode is to have the signal induced electrostatically therein by the current in the body, without direct contact between the electrode and the skin.

12. The apparatus as claimed in claim 8 wherein the receiver includes a demodulator to demodulate a pulse modulated with an identification code corresponding to said remote unit.

13. The apparatus as claimed in claim 1 further including a transceiver for providing a telecommunications link with a cellular mobile network.

14. The apparatus according to claim 1 wherein the second communication device is to transmit and receive pairing information to establish pairing with the remote device, the pairing information including an identification code for the apparatus and the remote unit respectively.

15. The apparatus as claimed in claim 1 wherein the second communication device is operable to signal to the remote unit through the second communication link to place the first, wireless communication link in an operational state.

16. The apparatus as claimed in claim 1 wherein the second communication device is operable to signal to the remote unit that the first communication device of the apparatus is to be powered off, such as to enable the remote unit to power down its connection to the first, wireless communication link.

17. The apparatus as claimed in claim 1 including an acoustic transducer to provide an audible output, a processor operable to provide an audio signal for the transducer to produce an audible output, the second communication device being operable through said second communication link to determine whether the remote unit is in an operational condition to process the audio signal at an acoustic transducer at the remote unit, and the processor being operable to route the audio signal selectively to at least one of said acoustic transducers depending on said determined operational condition of the remote unit.

18. The apparatus as claimed in claim 17 wherein the routing of the audio signal to the acoustic transducer of the remote unit occurs through the first, wireless communication link.

19. The apparatus as claimed in claim 1 comprising a headset.

20. The apparatus as claimed in claim 1, comprising a mobile telephone handset.

21. The apparatus as claimed in claim 1 wherein the controller is operable to instruct the remote unit to be operational for the first link based on a selective user input.

22. The apparatus as claimed in claim 1 wherein the controller is operable to instruct the remote unit to be operational for the first link in response to an incoming call.

23. The apparatus as claimed in claim 1 including a battery to power the first and second communications devices.

24. A method comprising:
establishing, with a first communications device of a mobile communication apparatus, a first, wireless communication link between the mobile communication apparatus and a remote unit;
establishing, with a second communications device of the mobile communication apparatus a second communication link between the mobile communication apparatus and the remote unit through the body of the person, and sending a challenge from the mobile communication apparatus through the second communication link to the remote unit;
based on a response received with the second communications device over the second communication link to the challenge that comprises an indication of whether the remote unit is operable to communicate with the mobile communication apparatus through the first, wireless communication link, instructing the remote unit, with the second communications device through the second communication link, to switch between operational and non operational states regarding communication through the first, wireless communication link.

25. The method as claimed in claim 24 including communicating pairing information between mobile communication apparatus and the remote unit through the second communication link, and storing the pairing information in the mobile communication apparatus and the remote unit for authentication of further communications between the mobile communication apparatus and the remote unit.

26. The method as claimed in claim 25 including switching on the remote unit for communication with the mobile communication apparatus through the second communication link, and if the checking through the second communication link to determine if the mobile communication apparatus is configured to communicate through the first, wireless communication link reveals that the mobile communications apparatus is so configured, commencing communication between the remote unit and the mobile communication apparatus through the first, wireless communication link.

27. The method according to claim 26 including sending an instruction through the second communication link from the remote unit to instruct the mobile communication apparatus to enable the first, wireless communication link.

28. The method as claimed in claim 24 including sending an instruction through the second communication link from one of the mobile communication apparatus and the remote unit, to the other thereof that communication through the first, wireless communication link is to be discontinued.

29. The method as claimed in claim 28 including powering down the first communication link at said other one of the mobile communication apparatus and the remote unit, upon receipt of said instruction.

30. The method as claimed in claim 24, wherein the mobile communication apparatus includes a controller, the method including providing an audio signal for an acoustic transducer in the mobile communication apparatus to provide an audible output, determining, at the mobile communication apparatus through said second communication link, whether the remote unit is in an operational condition to process the audio signal at an acoustic transducer at the remote unit, and the controller of the mobile communication apparatus routing the audio signal selectively to at least one of said acoustic transducers depending on said determined operational condition of the remote unit.

31. The method as claimed in claim 30 wherein the routing of the audio signal by the controller includes selectively routing the audio signal to the acoustic transducer of the remote unit through the first, wireless communication link.

32. A computer readable medium encoded with a computer program executable by at least one processor to perform operations comprising:
establishing, with a first communication device, a first wireless communication link with a remote unit; and
establishing, with a second communication device, a second communication link with the remote unit through a body of a person, and
controlling, with a controller, an operation of the first and second communications devices;
wherein the controller, when in operation, instructs the second communication device to send a challenge through the second communication link to the remote unit, and
based on a received response over the second communication link to the challenge that comprises an indication of whether the remote unit is in an operational state to communicate through the first wireless communication link, the controller instructs the remote unit through the second communication link to switch between operational and non operational states regarding communication through the first communication link.

33. An integrated circuit comprising:
a first circuit to establish a first, wireless communication link with a remote unit; and
a second circuit to establish a second, communication link with the remote unit through a body of a person, and
a third circuit to control an operation of a first and second communications devices;

wherein the third circuit, when in operation, instructs the second circuit to send a challenge through the second communication link to the remote unit, and based on a received response over the second communication link to the challenge that comprises an indication of whether the remote unit is in an operational state to communicate through the first, wireless communication link, the third circuit to instruct the remote unit through the second communication link to switch between operational and non operational states regarding communication through the first communication link.

34. A mobile communication system for use by a person, comprising:

a mobile communication apparatus and a remote unit, the mobile communication apparatus including a first communications device to establish a first, wireless communication link with a remote unit, and a second communications device to establish a second communication link with the remote unit through the body of the person, the remote unit including a first communications device to establish said first wireless communication link with the first communications device of the mobile communications apparatus, and a second communications device to establish said second communication link through the body of the person, a battery to power said first and second communications devices of the remote unit, and a switch operable by the person to control operation of the first communication device of the remote unit, wherein the second communication device of the mobile communication apparatus is to send a challenge through the second communication link to the remote unit, and based on a received response over the second communication link to the challenge that comprises an indication of whether the remote unit is in an operational state to communicate through the first, wireless link, the mobile communication apparatus instructs the remote unit through the second communication link to switch between operational and non-operational states regarding communication through the first wireless communication link.

35. The system claimed in claim 34 wherein the mobile communication apparatus includes a controller operable to control operation of the first communications device of the mobile communication apparatus in dependence on the outcome of communication performed by the second communication devices through the body of the person.

* * * * *